US012166791B2

(12) United States Patent
St. Pierre et al.

(10) Patent No.: US 12,166,791 B2
(45) Date of Patent: Dec. 10, 2024

(54) DETECTING DDOS ATTACKS BY CORRELATING INBOUND AND OUTBOUND NETWORK TRAFFIC INFORMATION

(71) Applicant: Arbor Networks, Inc., Westford, MA (US)

(72) Inventors: Brian St. Pierre, Acworth, NH (US); Steinthor Bjarnason, Fjerdingby (NO)

(73) Assignee: ARBOR NETWORKS, INC., Westford, MA (US)

( * ) Notice: Subject to any disclaimer, the term of this patent is extended or adjusted under 35 U.S.C. 154(b) by 211 days.

(21) Appl. No.: 17/829,882

(22) Filed: Jun. 1, 2022

(65) Prior Publication Data
US 2023/0396648 A1 Dec. 7, 2023

(51) Int. Cl.
*H04L 9/40* (2022.01)
(52) U.S. Cl.
CPC .................. *H04L 63/1458* (2013.01)
(58) Field of Classification Search
CPC .................................................. H04L 63/1458
See application file for complete search history.

(56) References Cited

U.S. PATENT DOCUMENTS

| | | | |
|---|---|---|---|
| 7,584,507 B1 * | 9/2009 | Nucci | H04L 63/1416 726/22 |
| 2005/0010817 A1 * | 1/2005 | Jakubik | H04L 63/1458 726/4 |

(Continued)

OTHER PUBLICATIONS

Jing et al., "Security Data Collection and Data Analytics in the Internet: A Survey", (2019) IEEE Communications Surveys & Tutorials, vol. 21, No. 1, pp. 586-618.

(Continued)

*Primary Examiner* — Saleh Najjar
*Assistant Examiner* — Devin E Almeida
(74) *Attorney, Agent, or Firm* — Foley & Lardner LLP

(57) ABSTRACT

A computer system and process for mitigating a Distributed Denial of Service (DDoS) attack by analyzing and correlating inbound and outbound packet information relative to the one or more protected computer networks for detecting novel DDoS Reflection/Amplification attack vectors. Created are separate data repositories that respectively store information relating to captured inbound and outbound packets flowing to and from the protected computer networks. Stored in each respective inbound and outbound data repository are identified inbound destination ports respectively associated with the captured inbound and outbound packets such that each identified inbound destination port number is associated with 1) a packet count relating to the inbound and outbound packets; and 2) a packet byte length count relating to each of the inbound and outbound packets. By accessing the inbound and outbound data repositories, a determination is made as to whether a total inbound packet count for a first inbound destination port is substantially the same to a total outbound packet count for a same inbound destination port. A next determination is then made as to whether a total outbound packet byte length count for the first inbound destination port exceeds a total inbound packet byte length count for the same inbound destination port. DDoS attack mitigation is automatically performed for the protected computer networks responsive to preferably determining 1) the total inbound packet count for a first inbound destination port is substantially the same to a total outbound packet count for a same inbound destination port; and 2) the total outbound packet byte length count exceeds a ratio value relative to the total inbound packet byte length count for the same inbound destination port.

18 Claims, 3 Drawing Sheets

(56) References Cited

U.S. PATENT DOCUMENTS

| | | | |
|---|---|---|---|
| 2013/0219502 A1* | 8/2013 | Danford | G06F 21/55 |
| | | | 726/23 |
| 2015/0026800 A1* | 1/2015 | Jain | H04L 63/1416 |
| | | | 726/22 |
| 2019/0297096 A1 | 9/2019 | Ahmed et al. | |
| 2021/0320943 A1* | 10/2021 | St. Pierre | H04L 63/20 |
| 2023/0283631 A1* | 9/2022 | Bjarnason | H04L 63/1458 |
| | | | 726/22 |

OTHER PUBLICATIONS

PCT International Search Report and Written Opinion dated Sep. 25, 2023 in International Application No. PCT/US2023/024051.

* cited by examiner

DETECTING DDOS ATTACKS BY CORRELATING INBOUND AND OUTBOUND NETWORK TRAFFIC INFORMATION

BACKGROUND

1. Field

The disclosed embodiments laterally relate to methods and systems for mal w are detection and subsequent mitigation, and specifically to correlating traffic statistics for inbound and outbound network traffic to a protected computer/network for detecting Distributed Denial of Service ("DDoS") attacks.

2. Description of Related Art

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc.

A particular type of DDoS attack is a DNS Reflection Attack, also known as a DNS Amplification Attack. In this attack, a malicious party use's open DNS servers to amplify their attack traffic—for instance, by up to 100 times the original source traffic performing the attack. This form of DDOS attack can turn 100 MB's of DNS request traffic into 10 Gb's of DDOS traffic targeting an online resource. Ultimately this can lead to a service outage for legitimate users of the targeted system or web property.

It is generally understood that a reflection attack involves an attacker spoofing a target's IP address and sending a request for information, primarily using the User Datagram Protocol (UDP) or in some cases, the Transmission Control Protocol (TCP). The server then responds to the request, sending an answer to the target's IP address. This "reflection", using the same protocol in both directions, is why this is called a reflection attack. Any server operating UDP or TCP-based services can be targeted as a reflector. With regard to Amplification attacks, they generally generate a high volume of packets that are used to overwhelm the target website without alerting the intermediary. This occurs when a vulnerable service responds with a large reply when the attacker sends his request, often called the "trigger packet". Using readily available tools, the attacker is able to send many thousands of these requests to vulnerable services, thereby causing responses that are considerably larger than the original request and significantly amplifying the size and bandwidth issued to the target.

It is to be appreciated that in Amplification and Reflection DDoS attacks, a malicious party controlling a small number of bot network systems, can amplify their attack traffic to create a crushing flood of data to the targeted machine knocking it offline. Thus, attackers are increasingly leveraging network protocols to launch reflection/amplification DDoS attacks which consist of amplified attack traffic that is difficult to distinguish from responses to legitimate application/service queries.

It is noted that there are currently techniques for diagnosing and blocking reflection/amplification DDoS attacks that use known amplification protocols. For instance, if a novel amplification protocol is detected in an attack scenario, current attack detection systems may detect the novel amplification protocol but nevertheless will be unable to categorize it in such a way that it can be automatically blocked without requiring human intervention. Thus, currently, mitigating a detected reflection/amplification DDoS attack requires human-to-human communication and manual reconfiguration of deployed systems. Hence, requiring human intervention necessitates that the response time mitigation deployment is significantly delayed, thus networks experiencing DDoS attacks often remain out of service for a prolonged time period.

Hence, the architecture of the Internet makes networks and network devices vulnerable to the growing problems of such DDoS attacks. Therefore, the ability to avoid or mitigate the damages of a DDoS attack, while preventing blocking of valid hosts, is advantageous to devices located in a protected network.

SUMMARY

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

Generally, the illustrated embodiments relate to a system and method for intercepting inbound traffic packets (e.g., from the Internet to a protected network) and outbound traffic packets (e.g., from the protected network to the Internet) so as to correlate traffic statistics associated with the inbound and outbound traffic packets for detecting novel DDoS Reflection/Amplification attack vectors.

In accordance with an illustrated embodiments, in one aspect provided is a computer system and process for mitigating a Distributed Denial of Service (DDoS) attack by analyzing and correlating inbound and outbound packet information relative to the one or more protected computer networks for detecting novel DDoS Reflection/Amplification attack vectors. Created are separate data repositories that respectively store information relating to captured inbound and outbound packets flowing to and from the protected computer networks. Stored in each respective inbound and outbound data repository are identified inbound destination ports respectively associated with the captured inbound and outbound packets such that each identified inbound destination port number is associated with 1) a packet count relating to the inbound and outbound packets; and 2) a packet byte length count relating to each of the inbound and outbound packets. By accessing the inbound and outbound data repositories, a determination is made as to whether a total inbound packet count for a first inbound destination port is substantially the same to a total outbound packet count from the same inbound destination port. A next determination is then made as to whether a total outbound packet byte length count for the first inbound destination port exceeds a total inbound packet byte length count from the same inbound destination port. DDoS attack mitigation is automatically performed for the protected computer networks responsive to preferably determining 1) the total inbound packet count for a first inbound destination port is substantially the same to a total outbound packet count from the same inbound destination port; and 2) the total outbound packet byte length count exceeds a ratio value relative to the total inbound packet byte length count for the same inbound destination port.

BRIEF DESCRIPTION OF THE DRAWINGS

So that hose skilled in the art to which the subject disclosure appertains will readily understand how to make and use the devices and methods of the subject disclosure without undue experimentation, illustrated embodiments thereof will be described in detail herein below with reference to certain figures, wherein.

DETAILED DESCRIPTION OF CERTAIN EMBODIMENTS

Figure 1:
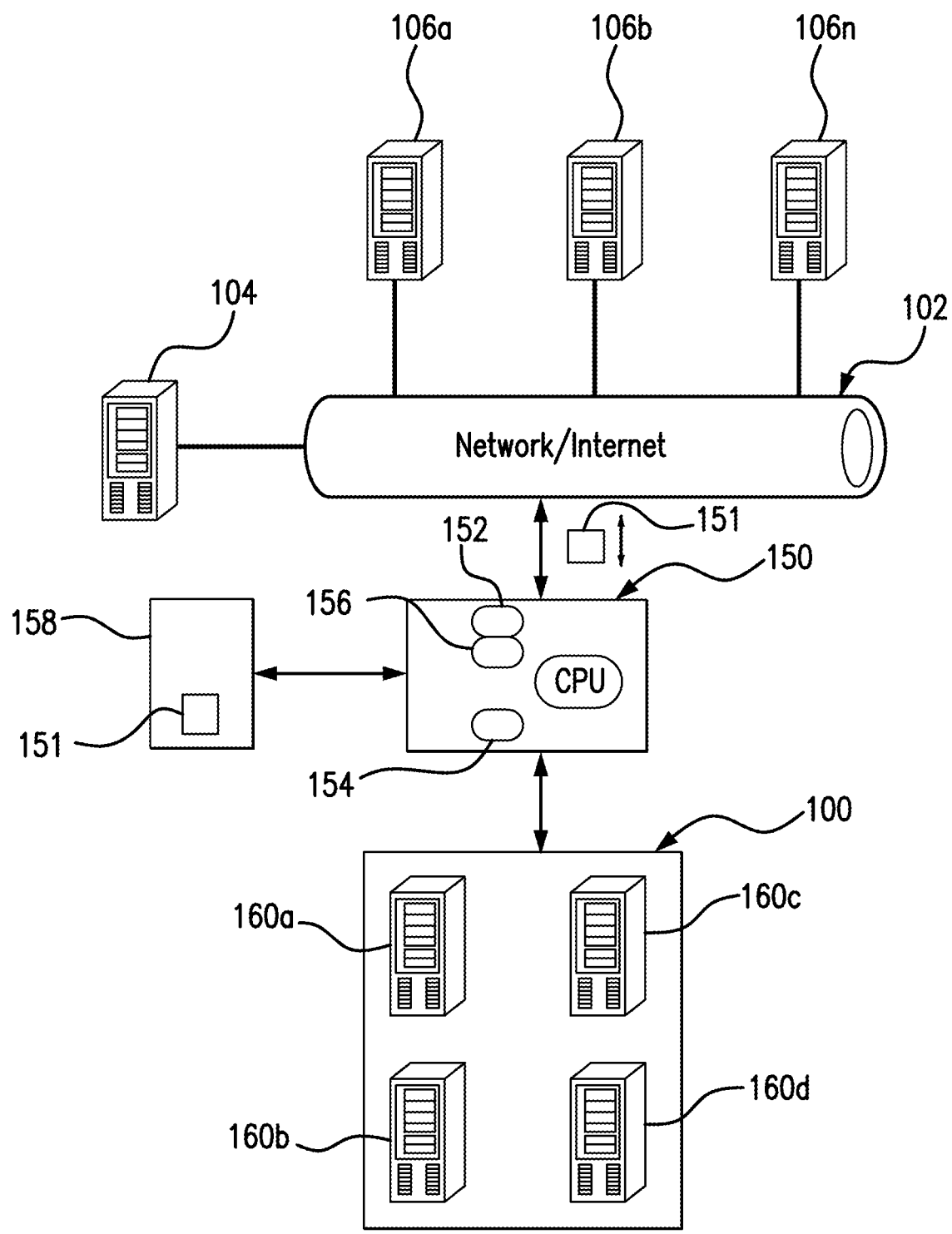
FIG. 1 is a schematic diagram illustrating network architecture and the relationship between an attack mitigation device and protected network according to an illustrated embodiment.

Aspects of the disclosed embodiments are illustrated in the following description and related drawings directed to specific illustrated embodiments. Alternate embodiment's may be devised without departing from the scope of the illustrated embodiments. Additionally, well-known elements of the illustrated embodiments will not be described in detail or will be omitted so as not to obscure the relevant details of the illustrated embodiments.

The word "exemplary" is used herein to mean "serving as an example, instance, or illustration." Any embodiment described herein as "exemplary" is not necessarily to be construed as preferred or advantageous over other embodiments. Likewise, the term "illustrated embodiments" does not require that all illustrated embodiments include the discussed feature, advantage or mode of operation.

Unless defined otherwise, all technical and scientific terms used herein have the same meaning as commonly understood by one of ordinary skill in the art to which the illustrated embodiments belong. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. The terminology used herein is for the purpose of describing particular embodiments only and is not intended to be limiting of the illustrated embodiments. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the illustrated embodiment's may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the embodiments described herein are not to be limited by what has been particularly shown and described, except as indicated by the appended claims.

It is to be further understood the illustrated embodiments of the present illustrated embodiments describe a system, apparatus and process for avoiding and mitigating the harmful effects of a DDoS attack on protected network by correlating traffic statistics associated with the inbound and outbound traffic packets ingressing and egressing to and from a protected network for detecting novel DDoS Reflection/Amplification attack vectors.

Turning now descriptively to the drawings, in which similar reference characters denote similar elements throughout the several views, FIG. 1 illustrates the relationship between a protected network 100, attack mitigation device 150, Internet 102, and external host devices 106a, 106b ... 106n, 104.

In a typical implementation, the external host devices 106a, 106b ... 106n, 104 (also referred to as external devices or host devices) attempt to connect to protected devices 160 within the protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred illustrated embodiment, the protected network 100 is protected by the attack mitigation device 150 preferably located between the Internet 102 and the protected network 100. Usually, the protected network 100 is an enterprise network, such as a school network, business network, and government network, to list a few examples. In other embodiments, the attack mitigation device 150 is located within the Internet, service provider network or enterprise network rather than as a network edge as illustrated. It is to be appreciated that when deployed within the protected network, traffic is diverted to the mitigation device 150. Examples of such a mitigation device 150 include the Arbor Threat Mitigation System™ device and Arbor Edge Defense™ inline security appliance, both commercially available from NetScout Systems, Inc.

The mitigation device 150 preferably includes a packet processing system preferably having an external high-speed network interface 152 and a protected high-speed network interface 154. Under current technology, these interfaces are capable of handling 1.0-400 Gbps, for example. The mitigation device 150 may further include processors 156 that preferably process the inbound and outbound packets 151 received at interfaces 152 and 154. Additionally, a central processing unit (CPU), random access memory (RAM), and a storage medium 158 are preferably used to further support the processing of the received packets and are described in detail below in conjunction with FIG. 2. The storage medium 158 also preferably stores hash structures and filter candidates, as described in detail below.

In a typical implementation, the mitigation device 150 authenticates all external host devices 106a, 106b ... 106n, 104 before allowing the external devices to access the protected devices 160 within the protected network 100.

According to exemplary configuration illustrated in FIG. 1, the attack mitigation device 150 may comprise a Client Edge (CE) device. The CE device can provide entry points into the protected network 100. In alternative configuration, the attack mitigation device 150 may comprise a virtual device. In other words, at least some of the embodiments do not require the attack mitigation device 150 to be a physical hardware device or to be located in a particular part of the network infrastructure, as long as the attack mitigation device 150 can be in the path of the incoming traffic to the protected network 100.

Figure 2:
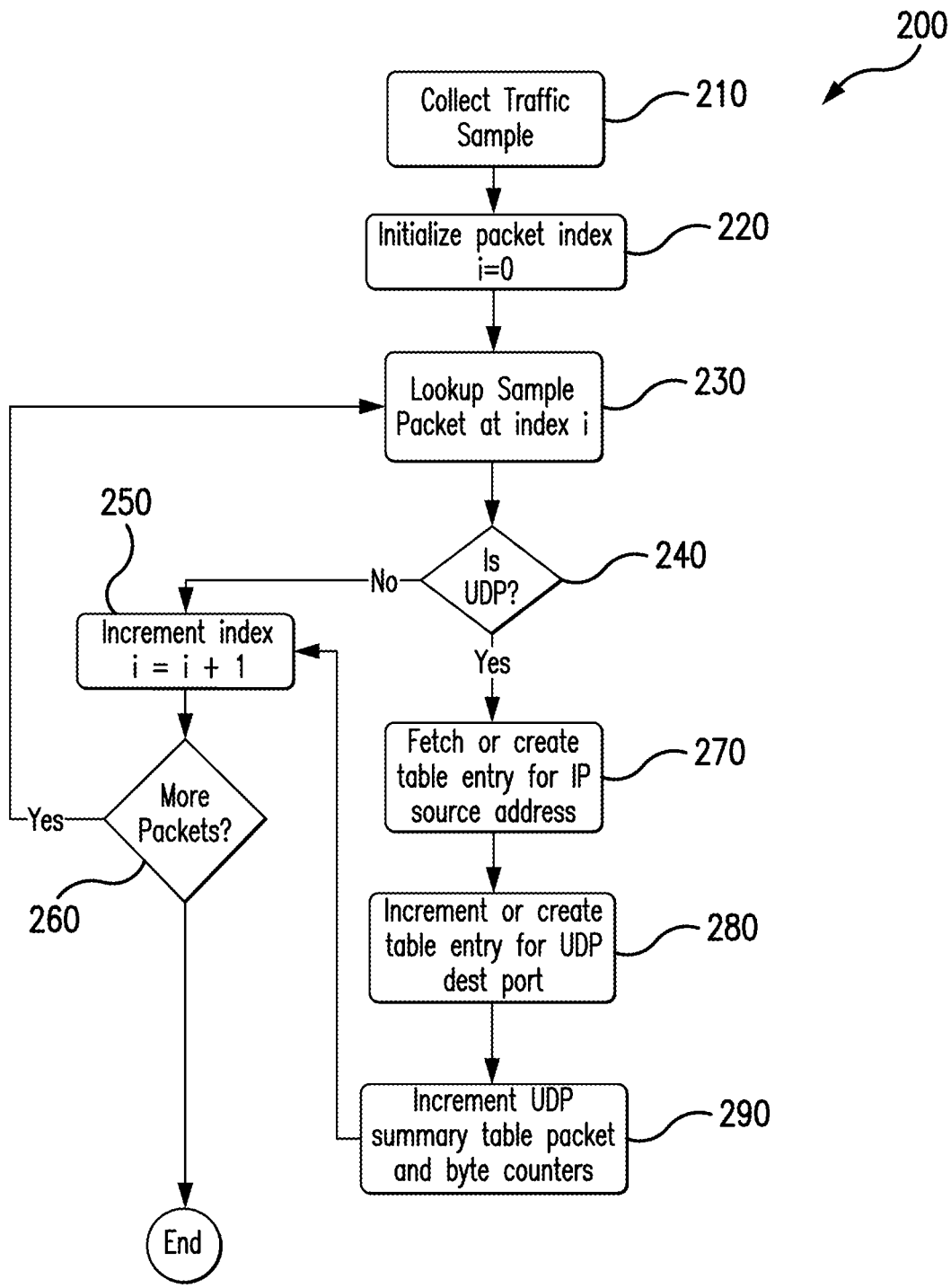
FIGS. 2 and 3 are flowcharts illustrating a method for correlating traffic statistics associated with the inbound and outbound traffic packets relative to a protected network for detecting novel DDoS Reflection/Amplification attack vectors in accordance with an illustrated embodiment.
Figure 3:
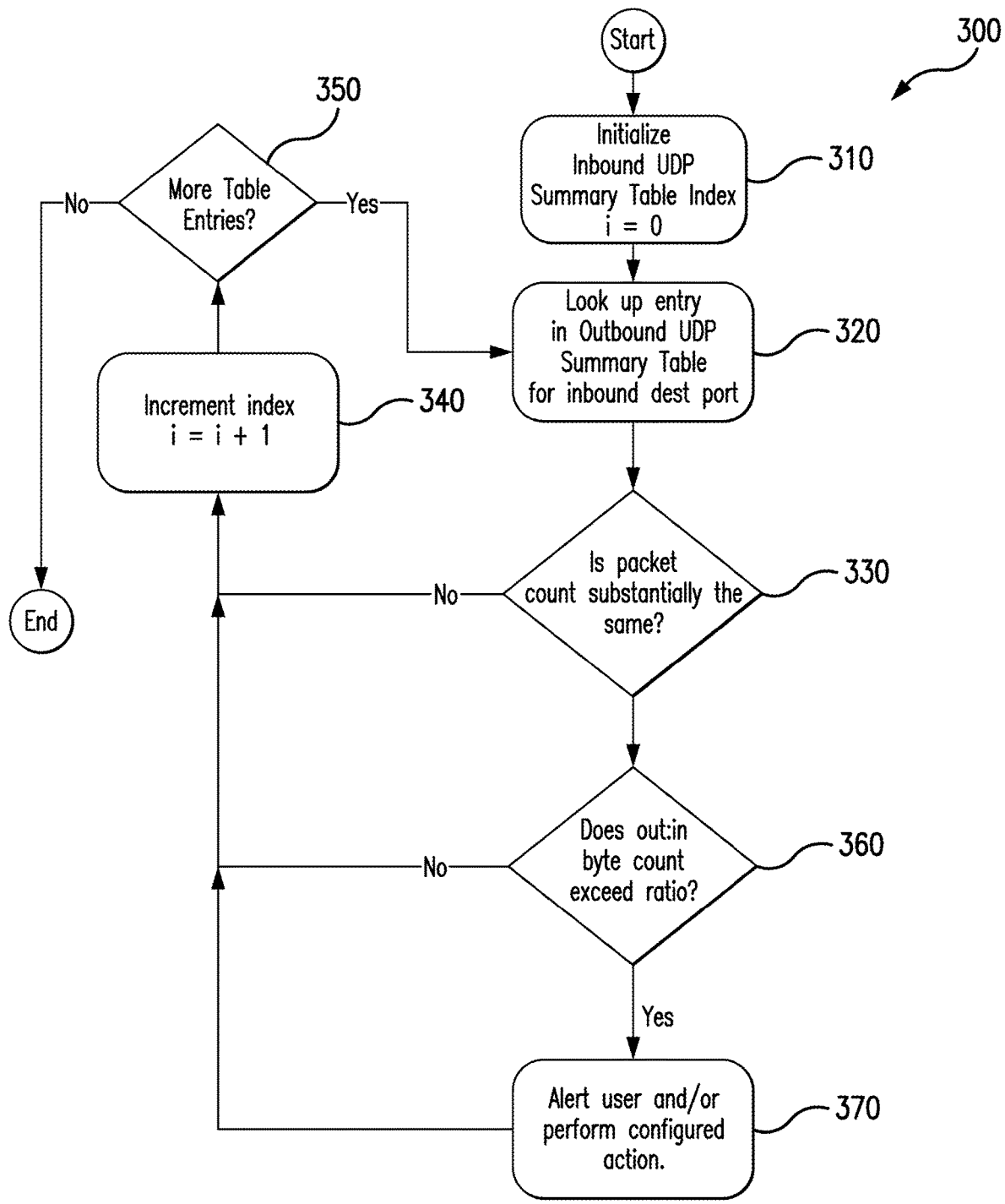

Turning to FIGS. 2-4, illustrated are exemplary and non-limiting flowcharts depicting a method for mitigating network attacks in mitigation device 150 in accordance with certain illustrated embodiments. Before turning to description of FIGS. 2-4, it is noted that the flow diagrams in FIGS. 2-4 illustrate exemplary operational steps as carried out in a particular order, as indicated by the lines connecting the blocks, but the various steps shown in these flow diagrams are to be understood to be performed in any order, or in any combination or sub-combination that achieves a desired result in accordance with the illustrated embodiments. It should be appreciated that in some embodiments some of the steps described below may be combined into a single step. In some embodiments, one or more additional steps may be included.

It is to be appreciated that the below described embodiments generally relate to a network attack mitigation device (150) configured and operable to analyze fundamental aspects of observed intercepted network traffic (e.g., information relating to inbound and outbound traffic packets 151), such as (but not limited to) stored metadata relating to the intercepted network traffic that includes: source and destination IP addresses; protocols; and ports, associated with the intercepted inbound and outbound network traffic, or packet header information relating to the inbound and outbound intercepted network traffic, so as to correlate traffic statistics associated with the inbound and outbound traffic packets for detecting novel DDoS Reflection/Amplification attack vectors.

It is to be further appreciated that the below described embodiments are described with reference to the intercepted inbound and outbound network traffic packets including either User Datagram Protocol (UDP) packets or Transmission Control Protocol (TCP) packets, which is provided below in conjunction with an illustrated exemplary embodiment and thus is to be understood to be only exemplary of the type of network traffic packets analyzed by the illustrated embodiment as the illustrated embodiment is not to be understood to be limited to network traffic flow having either UDP or TCP packets.

With reference to FIG. 2 (and with continued reference to FIG. 1) described now is an exemplary process (referenced generally by 200), utilizing an attack mitigation device (e.g., 150) for mitigating a Distributed Denial of Service (DDoS) attack to one or more protected computer networks 100 by correlating traffic statistics associated with the inbound and outbound traffic packets for detecting DDoS attacks. An example of such a DDoS attack is one of a Reflection attack and/or Amplification attack. It is to be appreciated that the attack mitigation device 150 preferably intercepts inbound and outbound network traffic packets 151 flowing from one or more external computers 106a-106n, 104 to one or more protected computer networks 100. In accordance with the exemplary illustrated embodiment, the intercepted network traffic packets 151 include responses consisting of either Transmission Control Protocol (TCP) packets or User Datagram Protocol (UDP) packets, step 210. Preferably, metadata, as mentioned above, relating to both inbound and outbound intercepted traffic packets are stored in a storage device 158 operable associated with the mitigation device 150. With regard to intercepting, and storing metadata relating to the inbound and outbound traffic flow 151, it is to be appreciated a prescribed time period may be used and/or a prescribed volume of inbound/outbound traffic packets 151 is used for defining the amount of inbound/outbound metadata stored in storage 158. It is to be appreciated each inbound/outbound packet intercepted and having metadata stored in storage 158 is preferably provided with an index value "i", which is subsequently increased for each subsequent stored inbound/outbound packet intercepted and having metadata stored in storage 158, wherein a respective value "t" represents the total number of stored inbound/outbound packets intercepted and having metadata stored in storage 158.

Starting at step 220, the process 200 for accessing the stored inbound/outbound metadata (step 210) stored in storage 158 is first described with regard to creating an inbound traffic flow Internet Protocol (IP) Table. The inbound traffic flow Internet Protocol (IP) Table, as described herein, is preferably keyed by an IP address associated with each inbound packet wherein each entry in the inbound IP table preferably contains a sub: 1) Protocol Table keyed by a destination port number associated with each captured inbound packet; and a 2) Summary Protocol Table containing a total packet count and byte length count attributable for each inbound packet. At step 220, a packet index counter "i" is set to zero (0). At step 230, metadata relating to an inbound packet having an index value of the current "i" value is extracted from storage 158. In accordance with the exemplary illustrated embodiment, at step 240 a first determination is made as to whether the current extracted packet information relates to a User Datagram Protocol (UDP) (or Transmission Control Protocol (TCP) in other exemplary embodiments). If no, the value of the packet index counter is increased, step 250, and a determination is made as to whether there are additional packets having metadata stored in storage 158 (preferable by comparing the current index counter value "i" against the aforesaid total number of stored inbound/outbound packets intercepted (e.g., value "t") having metadata stored in storage 158. If no, than the process 200 for creating the aforesaid inbound traffic flow IP Table for the intercepted inbound packets is complete. And if yes, a subsequent inbound packet having metadata stored in storage 158 is extracted from storage 158 so as to then be subjected to the aforesaid UDP/TCP determination of step 240.

Returning to step 240, if it is determined the current extracted packet information relates to a User Datagram Protocol (UDP) (or Transmission Control Protocol (TCP)), then at step 270 the process 200 determines if there is an entry in the inbound IP table for inbound packets based on the source IP of the inbound packet and creates one if not present. Next at step 280, process 200 determines if there is an entry in the IP table entry's UDP Summary table, preferably using the inbound UDP destination port number as the key, and creates a new entry if not present. Process 200 additionally increments a UDP-table-entry's packet counter by one, and byte counter by the number of bytes in the UDP payload. Next at step 290, process 200 preferably adjusts the entry in the UDP Summary table such that the packet counter increments by one and byte counter increments by the UDP payload size using the inbound UDP destination port number for inbound packets and the outbound UDP source port number for outbound packets. Process 200 then proceeds to steps 250, 260 for determining if there are additional packets having metadata stored in storage 158 (preferable by comparing the current index counter value "i" against the aforesaid total number of stored inbound/outbound packets intercepted and having metadata stored in storage 158). If yes, a subsequent inbound packet having metadata stored in storage 158 is extracted and then subjected to the aforesaid UDP/TCP determination of step 240.

And if no, than the process 200 for creating the aforesaid inbound traffic flow IP Table for the intercepted inbound packets is complete. It is appreciated the same process 200 described above with regard to inbound intercepted traffic packets 151 is also executed by mitigation device 150 with regards to outbound intercepted traffic packets 151. Thus separate flow IP Tables are created with respect to each of intercepted inbound and outbound traffic packets. Once the separate flow IP Tables are created with respect to each of intercepted inbound and outbound traffic packets, then process 300 is executed by mitigation device 150, as described below in accordance with an exemplary illustrated embodiment for correlating traffic statistics associated with the inbound and outbound traffic packets for detecting novel DDoS Reflection/Amplification attack vectors.

With reference now to FIG. 3 depicting process 300, at step 310 process 300 preferably initializes the aforesaid inbound UDP Summary Table Index (e.g., i=0), then at step 320 process 300 looks up the entry in the aforesaid outbound UDP Summary Table for the inbound destination port. Thus, for each UDP port number that provides an inbound-entry in the inbound Summary UDP Table, process 300 retrieves the corresponding outbound-entry in the outbound Summary UDP Table. Next, at step 330, process 300 determines whether a total inbound packet count for a current inbound destination port is substantially the same, according to a predetermined threshold count value, to a total outbound packet count for a same current inbound destination port. If no, no mitigation is performed with regard to entries associated with the current UDP destination port, and at step 340 the current packet index counter value "i" is increased preferably by one (1), and at step 350 a determination is made as to whether there are more entries in the inbound/outbound UDP Summary tables. If yes at step 350, process 300 returns to step 320 with regard to a subsequent entry in the inbound/outbound UDP Summary Tables, and if no at step 350, process 300 ends.

Returning to step 360, if process 330 determines that a total inbound packet count for a current inbound UDP destination port is substantially the same, preferably according to a predetermined threshold count value, to a total outbound packet count for a same current UDP inbound destination port, then process 300 proceeds to step 360. At step 360, process 300 determines whether a total outbound packet byte length count for the current inbound UDP destination port exceeds, preferably according to a predetermined ratio value, a total inbound packet byte length count for the same current inbound UDP destination port. If no, process 300 proceeds to the above described step 340 for determining whether subsequent inbound UDP destination ports are in the aforesaid inbound/outbound UDP Summary Tables. And if yes, then an user/administrator of the protected network 100 is automatically alerted of a detected DDoS network attack and/or one or more DDoS attack mitigation actions are preferably automatically performed for the protected computer network 100 responsive to determining the total outbound packet byte length count exceeds the ratio value relative to the total inbound packet byte length count for the regarding packets associated with the current inbound UDP destination port. Examples of such mitigation actions include (but are not to be understood to be limited to): blocking inbound traffic to the current inbound UDP destination port; rate-limiting inbound traffic to the current inbound UDP destination port; and/or blocking outbound traffic from the protected network 100 from that inbound UDP destination port (preferably where the outbound traffic exceeds a predetermined size). Once a user/administrator of the protected network 100 is automatically alerted and/or one or more DDoS attack mitigation actions are preferably automatically performed regarding the aforesaid detected DDoS attack (step 370), then the process 300 returns to the above described step 340 for determining whether subsequent inbound UDP destination ports are in the aforesaid inbound/outbound UDP Summary Tables.

In summary, various embodiments of the present illustrated embodiments disclose a novel approach to detecting DDoS attacks, such as Amplification/Reflection attacks, by intercepting inbound and outbound traffic packets, capturing certain metadata relating to the intercepted inbound and outbound traffic packets, creating separate destination port summary tables for the aforesaid intercepted inbound and outbound traffic packets so as to correlate traffic statistics associated with the inbound and outbound traffic packets for detecting novel DDoS Reflection/Amplification attack vectors.

The descriptions of the various illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for mitigating a Distributed Denial of Service (DDOS) attack to one or more protected computer networks by analyzing inbound and outbound packet information flowing to the one or more protected computer networks, the method comprising:
   accessing, by one or more processing circuits, a data repository storing first information relating to a plurality of inbound packets and a plurality of outbound packets associated with the one or more protected computer networks and second information identifying a plurality of ports associated with the plurality of inbound packets and the plurality of outbound packets, wherein each port of the plurality of ports is associated with 1) a first packet count indicating a number of inbound packets, 2) a second packet count indicating a number of outbound packets, 3) a first packet byte length count for the number of inbound packets, and 4) a second packet byte length for the number of outbound packets;
   creating, by the one or more processing circuits, an Internet Protocol (IP) table including indications of a respective port of the plurality of ports that is associated with one or more inbound packets of the plurality of inbound packets or one or more outbound packets of the plurality of outbound packets;
   determining, by the one or more processing circuits, that the first packet count for a first port of the plurality of ports is within a predetermined threshold count value with respect to the second packet count for the first port;
   determining, by the one or more processing circuits, that the first packet byte length count for the first port exceeds, according to a predetermined ratio value, the second packet byte length count for the first port; and
   performing, by the one or more processing circuits, a DDOS attack mitigation for the one or more protected computer networks responsive to determining that the first packet byte length count exceeds the second packet byte length count for the first port.

2. The computer implemented method as recited in claim 1, comprising:
   determining, by the one or more processing circuits, a difference between the first packet count for an identified port of the plurality of ports and the second packet count for the identified port.

3. The computer implemented method as recited in claim 1, further including creating the data repository by:
   intercepting, by the one or more processing circuits, inbound and outbound network traffic packets flowing to and from the one or more protected computer networks; and
   storing, by the one or more processing circuits, metadata relating to the inbound and outbound network traffic packets in a storage device.

4. The computer implemented method as recited in claim 3, further including:
   the IP table keyed by an IP address associated with each inbound packet of the plurality of inbound packets, and wherein each entry in the IP table contains 1) a protocol table keyed by a port number associated with each inbound packet and 2) a summary protocol table containing a total packet count and byte length count attributable for each inbound packet.

5. The computer implemented method as recited in claim 4, further including:
   the IP table keyed by an IP address associated with each outbound packet of the plurality of outbound packets, and wherein each entry in the IP table contains 1) a protocol table keyed by a port number associated with each outbound packet; and 2) a summary protocol table containing a total packet count and byte length count attributable for each outbound packet.

6. The computer implemented method as recited in claim 3, wherein the metadata includes: source IP addresses and destination IP addresses; protocols; and ports associated with the inbound and outbound network traffic packets.

7. The computer implemented method as recited in claim 3, wherein the metadata includes packet header information associated with the inbound and outbound network traffic packets.

8. The computer implemented method as recited in claim 3, wherein the inbound and outbound network traffic packets include User Datagram Protocol (UDP) Packets.

9. The computer implemented method as recited in claim 3, wherein the inbound and outbound network traffic packets include Transmission Control Protocol (TCP) Packets.

10. A computer system for mitigating a Distributed Denial of Service (DDOS) attack to one or more protected computer networks by analyzing inbound and outbound packet information flowing to the one or more protected computer networks, comprising:
   one or more databases having memory configured to store instructions; and
   a processor disposed in communication with said memory, wherein said processor upon execution of the instructions is configured to:
     access first information relating to a plurality of inbound packets and a plurality of outbound packets associated with the one or more protected computer networks and second information identifying a plurality of ports associated with the plurality of inbound packets and the plurality of outbound packets, wherein each port of the plurality of ports is associated with 1) a first packet count indicating a number of inbound packets, 2) a second packet count indicating a number of outbound packets, 3) a first packet byte length count for the number of inbound packets, and 4) a second packet byte length for the number of outbound packets;
     create an Internet Protocol (IP) table including indications of a respective port of the plurality of ports that is associated with one or more inbound packets of the plurality of inbound packets or one or more outbound packets of the plurality of outbound packets;

determine that the first packet count for a first port of the plurality of ports is within a predetermined threshold count value with respect to the second packet count for first port;

determine that the first packet byte length count for the first port exceeds, according to a predetermined ratio value, the second packet byte length count for the first port; and perform a DDOS attack mitigation for the one or more protected computer networks responsive to determining that the first packet byte length count exceeds the second packet byte length count for the first port.

11. The computer system as recited in claim 10, wherein the processor is configured to:

determine a difference between the first packet count for an identified port of the plurality of ports and the second packet count for the identified port.

12. The computer system as recited in claim 10, wherein the processor is configured to create a data repository by:

intercepting inbound and outbound network traffic packets flowing to and from the one or more protected computer networks; and storing metadata relating to the inbound and outbound network traffic packets in a storage device.

13. The computer system as recited in claim 12, wherein the IP table is keyed by an IP address associated with each inbound packet of the plurality of inbound packets, and wherein each entry in the IP table contains 1) a Protocol Table keyed by a port number associated with each inbound packet and 2) a Summary Protocol Table containing a total packet count and byte length count attributable for each inbound packet.

14. The computer system as recited in claim 13, wherein the IP table is keyed by an IP address associated with each outbound packet of the plurality of outbound packets, and wherein each entry in the IP table contains 1) a Protocol Table keyed by port number associated with each outbound packet and 2) a Summary Protocol Table containing a total packet count and byte length count attributable for each outbound packet.

15. The computer system as recited in claim 12, wherein the metadata includes: source IP addresses and destination IP addresses; protocols; and ports associated with the inbound and outbound network traffic packets.

16. The computer system as recited in claim 12, wherein the metadata includes packet header information associated with the inbound and outbound network traffic packets.

17. The computer system as recited in claim 12, wherein the inbound and outbound network traffic packets include User Datagram Protocol (UDP) Packets.

18. The computer system as recited in claim 12, wherein the inbound and outbound network traffic packets include Transmission Control Protocol (TCP) Packets.

* * * * *